Figure 1:
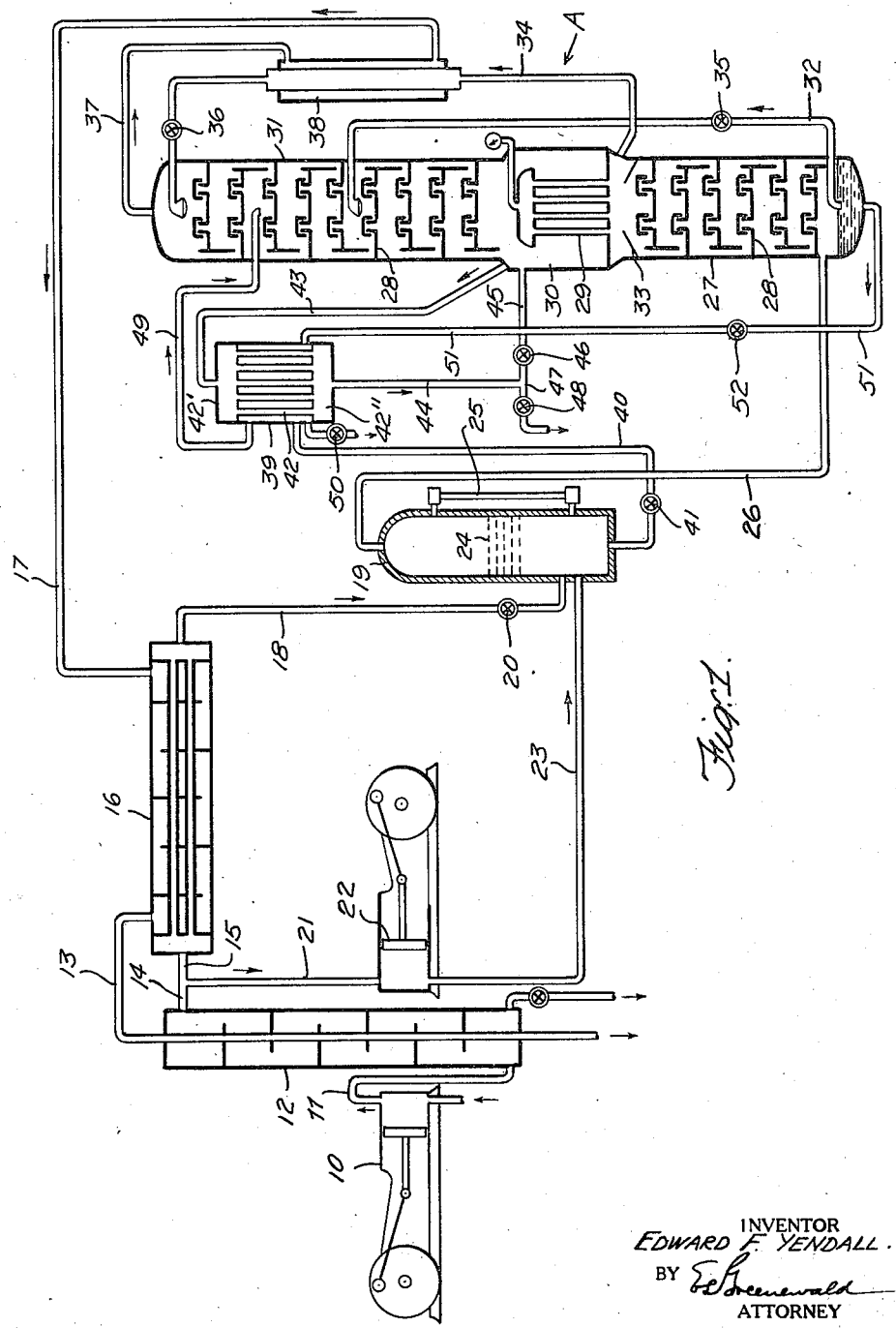

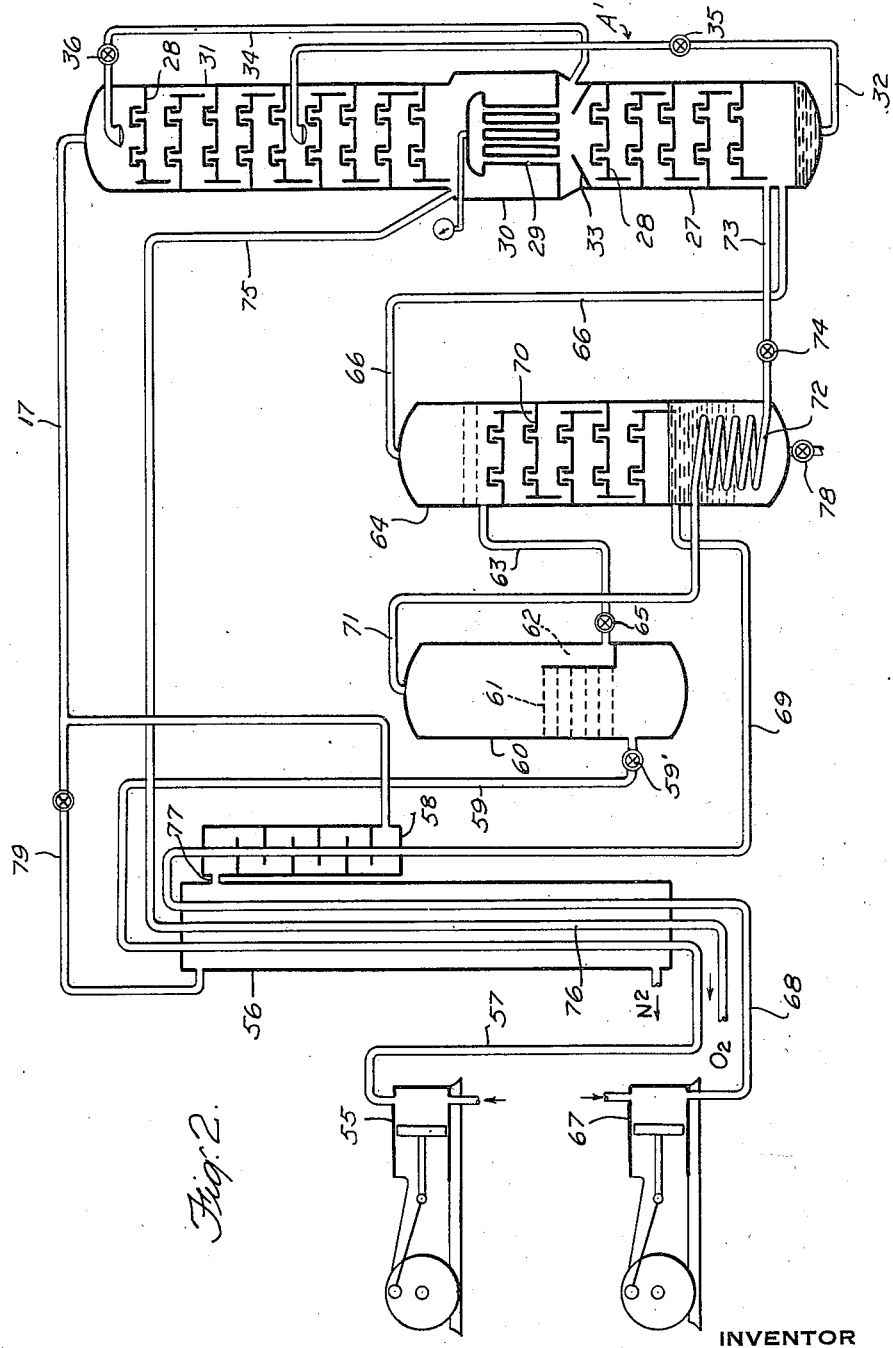

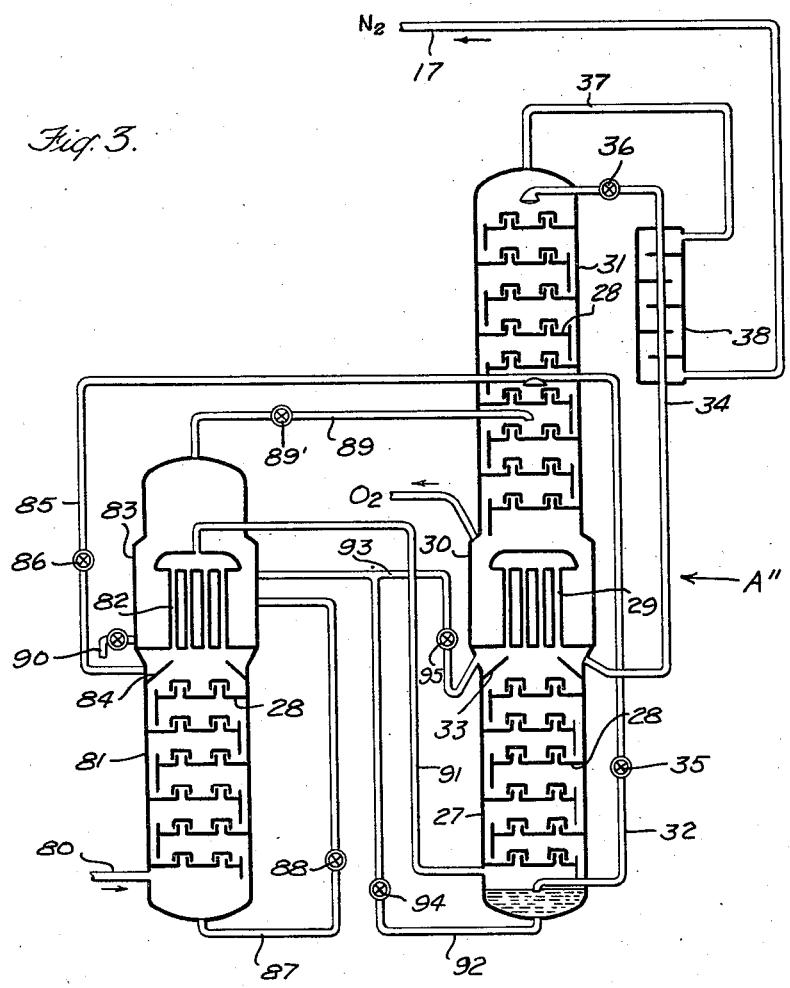

Patented June 23, 1942

2,287,158

UNITED STATES PATENT OFFICE 2,287,158

METHOD OF AND APPARATUS FOR SEPARATING GAS MIXTURES

Edward F. Yendall, Kenmore, N. Y., assignor to The Linde Air Products Company, a corporation of Ohio Application November 15, 1940, Serial No. 365,816

24 Claims. (Cl. 62—175.5)

This invention relates to improved methods of and apparatus for separating gas mixtures of relatively low boiling point into their constituents by liquefaction and rectification and more particularly to methods of and apparatus for separating air to provide an oxygen product of relatively high purity, especially a liquid oxygen product that is free of undesirable materials having a boiling point higher than that of oxygen.

Oxygen both in the liquid and the gaseous state is commonly produced from atmospheric air on a relatively large scale by partial liquefaction of the air and rectification at low temperatures, preferably in two stages. Such commercial oxygen preferably has a purity such that it contains no less than 99.6% oxygen, the permissible remainder being nitrogen and argon. Atmospheric air and particularly the air near cities and industrial areas contains, besides rare gases and carbon dioxide, minute quantities of hydrocarbon gases such as methane, acetylene, ethane, propylene, and other combustible gases of various kinds. Further traces of hydrocarbons may be introduced to the process air due to the lubrication of the air compressors used to compress the air to the relatively high pressures required for the liquefaction. Most of these minor impurities assume the liquid or solid state at liquid air and liquid oxygen temperatures and therefore will generally be carried by the liquefied portions of the air and by the liquid oxygen unless they are previously removed.

Since the nitrogen and argon content of commercial oxygen is not objectionable, such minute quantities of deleterious materials previously mentioned and including any carbon dioxide remaining in the air will be hereinafter referred to collectively as "impurities." Only the very lightest hydrocarbons such as methane and ethylene have appreciable vapor pressures at the temperature of liquid oxygen. Hence, methane and ethylene ordinarily do not concentrate in appreciable quantities. Any carbon dioxide left in the compressed air will assume a finely-divided solid state and if not removed will pass into the rectifying apparatus and cause trouble by clogging narrow passages. Most of the carbon dioxide is customarily removed from the air by a preliminary treatment such as by passing the air through moist hydrated lime beds or by washing the air with caustic solution. A small amount of carbon dioxide, however, may remain and in time could cause trouble in the separation apparatus particularly in liquid carrying lines. Such residual carbon dioxide is therefore also objectionable and may be removed simultaneously with the hydrocarbon impurities. The residual carbon dioxide will therefore be also included in the general term "the impurities."

When gaseous oxygen is withdrawn from a rectifying apparatus adapted for the production of gaseous oxygen, many of the impurities will be concentrated at the place where the oxygen is vaporized. Such concentration of hydrocarbon impurities in high purity oxygen may constitute a serious hazard in the production equipment. When, however, liquid oxygen is produced by an apparatus suitable for producing oxygen in the liquid state, the impurities may pass out with the liquid withdrawn and, as is often the case, when the liquid is subsequently vaporized for use, the hydrocarbon impurities will then be concentrated in the vaporizing apparatus where they would also constitute a hazard.

Efforts have been made to remove gaseous hydrocarbon impurities from the air before it is compressed by passing the air into intimate contact with an oil that has a high flash point. Such methods, however, do not completely remove the gaseous hydrocarbons and of course have no effect on any hydrocarbon introduced into the air due to the lubrication of the air compressors. It has also been proposed to filter the air after compression but this merely is effective to remove entrained lubricants and does not remove impurities which are in the gaseous state at such portions of the manufacturing cycle. The hydrocarbon impurities exist in raw air in very minute quantities which are of the order of fractional parts per million parts of air and therefore the removal of such minute quantities constitutes a very difficult problem. However, when large volumes of air are processed in air separation plants, the accumulation of such impurities may become a serious matter.

It has been proposed to filter the solidified impurities from the air after its liquefaction. This method is not entirely successful or satisfactory because certain of the impurities remain in solution to a limited extent in the liquid air and thus cannot be filtered. In order to avoid the hazard of accumulation of the hydrocarbon impurities, it has been proposed to continuously or periodically drain liquid from the oxygen vaporizer in order to limit the concentration to below a safe limit. Such method however may waste considerable oxygen, disturb the operation of the separation apparatus and does not entirely avoid the hazard of concentrating hydrocarbons in high purity liquid oxygen. In air separation plants which produce liquid oxygen, the impurities have been prevented from passing out with the liquid oxygen produced by effecting a carefully conducted vaporization of all the liquid oxygen and recondensing the oxygen vapors to produce the refined liquid oxygen product. Such method also does not entirely avoid the hazard of accumulating the hydrocarbons in high purity liquid oxygen.

It is a principal object of the present invention to provide an improved method and apparatus for separating gas mixtures of relatively low boiling point into their constituents with the simultaneous elimination of impurities of relatively higher boiling point in a manner which overcomes the objections of the prior methods. Other objects of this invention are to provide a method of and apparatus for separating air to produce nitrogen and oxygen including the simultaneous removal of impurities having a higher boiling point than oxygen; an improved procedure and apparatus for avoiding the hazards caused by the presence of hydrocarbons in air during the separation of air by liquefaction and rectification; a method of and apparatus for effecting the concentration of hydrocarbon impurities in a liquid of relatively low oxygen content during the separation of air; apparatus for the removal of impurities that can be economically applied to existing air separation apparatus; a method of and apparatus for the safe elimination of impurities which may be applied to existing procedures and plants for separating air without extensive alterations to such plants; a method of and apparatus for removing impurities before they reach the rectifying portions of an air separation apparatus; such a method and apparatus that may be particularly applied to air separation procedures and apparatus adapted for efficiently producing liquid oxygen; and such method and apparatus the principles of which may also be effectively applied to air separation procedures and apparatus producing gaseous oxygen.

These and other objects and advantages of this invention will become apparent from the following description and the accompanying drawings, in which:

Fig. 1 is a diagrammatic view of an exemplary apparatus illustrating the principles of this invention applied to air separation apparatus adapted for the production of liquid oxygen;

Fig. 2 is a diagrammatic view showing an exemplary apparatus illustrating an application of the principles of the present invention to an air separation plant producing gaseous oxygen and supplied with low-pressure and high-pressure compressed air; and, Fig. 3 is a similar view of another form of apparatus illustrating the principles of the present invention as applied to air separation apparatus supplied with air cooled to its condensation temperature but containing relatively little liquid air.

According to the present invention, air which may be substantially freed of carbon dioxide by a preliminary treatment, is compressed, freed of moisture and cooled to a relatively low temperature in the customary manner. In most instances the air is sufficiently cooled so that a relatively small part of the air is liquefied. The cooled and partially liquefied air is then separated into liquid and gaseous portions or fractions in such a manner that the liquid fraction carries substantially all the impurities. The gaseous fraction is then passed into the first stage of the rectification and the liquid fraction is almost completely vaporized at a relatively low temperature. The vapors resulting from such vaporization will be substantially free of the impurities and are therefore passed directly into the rectifying apparatus, preferably into the second stage portion. Substantially all the impurities will be retained in the vaporizer in a liquid which has a relatively low oxygen content and from the vaporizer the impurities are withdrawn from time to time as they accumulate. The compressed and cooled air may be partially expanded before or after the phase separation is effected as will be specifically described hereinafter. The incoming air may also be supplied at a single pressure or at two pressures.

The vaporization of the liquid phase portion may be effected in several ways. For example, when it is desired to produce liquid oxygen, it is found desirable to vaporize the liquid phase portion by heat exchange with gaseous oxygen produced by the air separation apparatus, such heat exchange producing a liquid product of high purity. When it is desired to produce gaseous oxygen the vaporization of the liquid phase portion may be effected by heat exchange with portions of the incoming gaseous air to partly or completely condense such portions. The principles of the present invention may also be applied in certain apparatus for producing gaseous oxygen in which the incoming air is cooled only to the condensation temperature and is not liquefied. The incoming air in such case is scrubbed at an intermediate pressure with a portion of liquid air produced by condensing some of the incoming air by effecting a heat exchange with portions of the condensed liquid air after it has been employed for the scrubbing of all the incoming air. Such heat exchange also effects vaporization of the scrubbing liquid, the vapors of which are free from impurities and may be passed directly into the rectifying apparatus.

It is known that various forms of apparatus may be employed for preparing the incoming air and getting it into the condition desired for entry into an air separation rectifying column. In a two-stage air separating column the incoming air is introduced into the first stage preferably at a pressure of about 75 lbs. per sq. in. gauge and at a temperature which corresponds to its condensing temperature at the pressure. When liquid oxygen is to be produced, the incoming air is sufficiently refrigerated so that a substantial portion thereof is liquefied, for example, in an air separation plant in which liquid oxygen is produced, the incoming air will contain about twenty percent liquid air whereas in an air separation plant producing gaseous oxygen the incoming air should have about three percent liquid.

The apparatus of Fig. 1 produces liquid oxygen. In this form of apparatus any of several known ways of preparing the air for rectification may be employed and a suitable specific apparatus is illustrated in which all the air, preferably after treatment to remove carbon dioxide, is compressed to a relatively high pressure in an air compressor indicated at 10. Such compressor may have three or four stages although for simplicity a single stage is indicated. The compressed air is conducted through a conduit 11 into a heat exchanger 12, wherein it is countercurrently cooled by heat exchange with a cold nitrogen product flowing out through conduit 13.

After leaving the heat exchanger 12, the compressed air is divided into two portions, one of which passes through branch conduit 15 to a heat exchanger 16, in which a large portion is liquefied by heat exchange with the outflowing cold nitrogen leaving the separation apparatus through conduit 17. The cooled, and partly liquefied portion of the air passes from the high-pressure air tubes of heat exchanger 16 through a conduit 18 into the lower portion of a separator or scrubber 19. In the conduit 18 is a throttle valve 20 which is employed to expand and reduce the pressure of the air to an intermediate pressure maintained preferably substantially equal to the pressure of the first stage of rectification.

The remaining portion of the compressed air passes through a branch conduit 21 to an expansion engine 22 which is coupled to a suitable means for absorbing power not shown in the interest of clearness of the drawing. The expansion engine 22 expands the air it receives with the production of external work and consequently the production of a large volume of refrigeration so that the air discharged from the expansion engine through the conduit 23 is very cold. Such cold expanded air has substantially the same pressure as the first stage of rectification and is conducted directly into the lower portion of the scrubber-separator 19. All gaseous portions of the entering air are thus thoroughly mixed and scrubbed with liquid portions of air in the bottom of the scrubber-separator 19. If other forms of apparatus for refrigerating and partly liquefying the air are employed, all the air after refrigeration and reduction of pressure is introduced into the lower portion of the scrubber-separator 19. Thus, the air might be compressed to a high pressure cooled and throttle expanded to the scrubber pressure or the air may be compressed separately to two different pressures, one portion being compressed to relatively high pressure, cooled and expanded to scrubber pressure and the other portion compressed to a pressure only slightly higher than scrubber pressure, cooled and introduced into the scrubber together with the expanded high-pressure portion.

The scrubber-separator 19 preferably comprises a cylindrical tank which may have gas and liquid contact means interposed at an intermediate point therein such as a set of coarse screens 24. The scrubber also may be provided with suitable means for indicating the height of liquid air therein such as a gauge 25. The liquid should be maintained in the scrubber at a level high enuogh for efficient scrubbing action and such that there is a sufficient space above the liquid in which entrained particles of liquid can separate and fall down so that no liquid will be carried off through the opening at the top of the scrubber. The opening at the top of the scrubber is connected with the lower portion of the air separation column shown generally at A, by a conduit 26. The gaseous fraction separated in the scrubber-separator 19 is substantially free of impurities and is therefore passed directly into the air separation column.

The air separation column A is of a customary construction and comprises a lower column 27 containing rectifying trays or plates 28 and having at its upper end a condenser 29. The lower column 27 is thus in gaseous communication with the insides of the tubes of condenser 29 whereby vapors rising in the column will be condensed by heat exchange with liquid oxygen which accumulates around the outside of the condenser tubes 29. The condenser 29 is housed in a condenser housing 30 which holds a body of liquid oxygen rectified by the upper column. Above the condenser housing 30 is the second stage, low pressure or upper column 31 which is also filled with rectifying trays 28 similar to those in the lower column. Liquid air which contains about 30% oxygen accumulates in the bottom or sump of the lower column 27 and is transferred through a transfer line 32 into the upper column at an intermediate point thereof. The lower column is also provided with a nitrogen shelf 33 for collecting a portion of the liquid rich in nitrogen which is condensed by the condenser 29. Such nitrogen-rich liquid is transferred through a transfer line 34 to the upper end of the upper column to provide a reflux liquid for the upper column. Since the lower column is operated at approximately 75 lbs. per sq. in. pressure, the transfer lines 32 and 34 are provided with expansion valves 35 and 36, respectively.

The nitrogen product is discharged from the upper end of the upper column 31 through a conduit 37 which, if desired, may connect directly with the conduit 17 for conducting the nitrogen directly to the heat exchanger 16. However, as here shown, the nitrogen product is passed in heat exchanging relation with the liquid transferred through the nitrogen transfer line 34 by a heat exchanger 38 to which the conduits 37 and 17 are connected. The heat exchanger 38 serves to refrigerate the liquid transferred through the line 34 prior to its expansion through the valve 36 so that a greater proportion of the liquid will be available as reflux for the column.

The liquid portion of the incoming air which is collected in the lower part of the scrubber-separator 19 is transferred to a vaporizer 39 through a conduit 40 controlled by a valve 41. While any suitable form of apparatus for removing the higher boiling point impurities may be interposed in the conduit 40, in this form of apparatus it is preferable to vaporize the scrubber liquid by condensing gaseous oxygen. The vaporizer thus comprises a vaporizing chamber 39 surrounding a bundle of condenser tubes 42. The condenser tubes are provided with an upper header 42' which is connected with the gas space of the chamber 30 of the separating column by a conduit 43. The lower ends of the tubes 42 communicate with a lower header 42" which is provided with a liquid oxygen discharge conduit having two branches. One branch 45, controlled by a valve 46, is connected to the chamber 30 to return liquid oxygen thereto when desired, as will be hereinafter explained. The other branch 47 of conduit 44, controlled by a stop valve 48 conducts liquid oxygen to a storage tank or other receiving vessel (not shown). The vapors produced in the chamber 39 are conducted to a midpoint of the upper column by a conduit 49 that is connected to the upper portion of the chamber 39. The liquid air that contains the concentration of impurities is withdrawn through a valved withdrawal connection 50 from the bottom of the chamber 39. Sometimes it may be desirable to supply additional liquid to the vaporizer 39 and this may be done by an auxiliary transfer line 51 which is connected between the vaporizer 39 and the lower portion of the lower column 27 and is controlled by a valve 52.

After the apparatus illustrated in Fig. 1 has been started and is in normal operation, the compressor 10 will compress the preliminarily treated air to a pressure of about 2800 lbs. per sq. in. The moisture will be removed by suitable means such as traps and by refrigeration in the heat exchanger 12. The compressed air leaving the heat exchanger 12 through conduit 14 will be cooled to an intermediate low temperature, for example, a temperature that may be as low as about —40° C. The portion of the air that passes through conduit 21, is expanded in the expansion engine 22 with the production of external work to reduce the temperature of the expanded air leaving through conduit 23 to a temperature of about —165° C. The portion of the air passing through the conduit 15 is substantially liquefied in the liquefying heat exchanger 16 and is expanded by passage through the expansion valve 20 to the pressure maintained in the scrubber-separator chamber 19, which is substantially the same or only slightly higher than the pressure of the lower column 27. The gas and liquid portions are then intimately mingled in the lower part of the scrubber-separator 19 whereby the gas portion of the entering air is thoroughly scrubbed, the perforated plates 24 assisting in the scrubbing action by breaking up large bubbles of gas. The gaseous fraction of the entering air separates from the liquid fraction in the upper part of the scrubber 19 and is passed directly into the lower column 27. The vaporizer 39 operates under a pressure substantially the same as the pressure existing in the upper column 31 of the air separation apparatus which is preferably a pressure only slightly above atmospheric pressure and sufficient to drive the nitrogen out through the heat exchanger passages. The amount of liquid air passed through the conduit 40 into the vaporizer 39 is within, for example, about 5% of the amount which can be vaporized by the condensation of gaseous oxygen flowing through the conduit 43 to form the liquid oxygen produced. Minor adjustments in liquid quantities are made with valves 46, 48, 50, and 52 as explained below and the 5% variation would be affected by the amount of liquid drained from the connection 50.

The air which enters the lower column through the conduit 26 is at its condensation temperature corresponding to the pressure of the lower column which is about 75 lbs. per sq. in. gauge. Such air is liquefied by contact with cold liquefied portions of air which descend the column from the condenser 29. Thus, a rectifying action takes place in the column 27 so that air which is very rich in nitrogen reaches the condenser 29 and is liquefied therein. Thus, the liquid that reaches the bottom of the column 27 contains about 30% oxygen and is transferred to the upper column through the transfer line 32. A liquid very rich in nitrogen is collected on the shelf 33 and transferred through the line 34 to the top of the upper column in order to act as a reflux liquid and provide a sufficient rectifying action in the upper column. The condensation of nitrogen vapors under a pressure of about 75 lbs. per sq. in. in the condenser 29 supplies heat which causes the oxygen liquid collecting in the chamber 30 to boil and provides vapors for efficient rectifying action in the upper column. Sufficient heat is also provided to evaporate all the oxygen being produced and such oxygen vapor passes through the conduit 43 to the condenser tubes 42 wherein it is condensed to form liquid oxygen which is withdrawn through conduit 44, conduit 47, and valve 48. The pressure of the gas materials in the condenser 42 and in the chamber 39 is substantially the same. However, a temperature difference which causes efficient heat exchange exists due to the difference in composition of the gas materials, thus the liquid air in the chamber 39 has a boiling point, due to its high nitrogen content, below the condensation point of oxygen at the same upper column pressure.

The operation of the apparatus is very easily balanced because if there should be slightly too much liquid in the chamber 39 for the oxygen being withdrawn to fully vaporize, the valve 46 may be opened sufficiently to increase the flow of oxygen through the condenser tubes 42. This will provide more heat and completely vaporize all the liquid being transferred into the chamber 39 except that which is to be withdrawn at 50. If, on the other hand, the amount of liquid being passed through the conduit 40 into the chamber 39 is slightly less than enough to cause condensation to liquid form of all the liquid oxygen being withdrawn, additional liquid may be supplied to the chamber 39 by opening the valve 52 so as to effect a transfer of some of the liquid air collecting in the bottom of the column 27 to the chamber 39. The high boiling point impurities will accumulate in the chamber 39 and may be withdrawn together with some of the liquid air through the drain connection 50. Such drainage may be continuous at a relatively slow rate or may be preferably periodically done.

It will be seen that according to the invention the incoming air is separated into an impurity-free gaseous fraction and an impurity-containing liquid fraction, the gaseous fraction is passed into the first stage of rectification, the impurities separated by the evaporation of the major part of the liquid fraction at a reduced pressure, and the evaporation effected by condensing a corresponding amount of gaseous oxygen product. The heat exchange which evaporates the liquid fraction and condenses oxygen however includes an irreversible heat flow which therefore absorbs energy. Such energy absorption results in a reduction of the potential driving force of the rectification in the upper column shown by a change in reflux ratios. The net result is a slight reduction of efficiency of separation and a slightly lower yield of oxygen from a given quantity of air compressed. The energy for operating the impurity-eliminating system thus results ultimately in increased power per unit of oxygen produced but this is offset by the elimination of hazards and particularly in the double protection effected by firstly, the removal of the major part of the impurities at the drain 50 and secondly, the evaporation of the oxygen product in the chamber 30 and recondensation of the oxygen product in the condenser 42 which insures an impurity-free liquid-oxygen product.

In the form of apparatus illustrated in Fig. 2, the air separation column A' is supplied with air at two pressures by separate compressors, and the scrubbed liquid is vaporized by condensing portions of the incoming air. The separating column is similar to that previously described and the similar parts have the same reference numerals. In this form of apparatus, only a portion of the air is compressed to a high pressure in a high-pressure air compressor 55 and such high-pressure air is conducted through a countercurrent heat exchanger 56 by a conduit 57. The high-pressure air then passes through a conduit 59 to the lower portion of the scrubber-separator 60. The scrubber-separator causes an intimate mixing of the liquid and gas portions of the high-pressure air with the aid of perforated plates 61. The scrubber liquid which overflows the upper plate 61 falls into a cup 62 from which it is withdrawn through a conduit 63 through to the upper portion of a scrubber column 64. The scrubber column 64 operates under a pressure only slightly above that of the lower column 27 and therefore a throttle valve 65 is interposed in the line 63. The liquid entering the scrubber 64 is substantially completely vaporized and is conducted from the top of the scrubber 64 through a conduit 66 to the lower part of the column 27.

A substantial portion of the air to be separated is compressed to a relatively low pressure in the compressor 67 and such compressed air is conducted through conduit 68 through the heat exchanger 56. The low-pressure air is then passed through an additional heat exchanger 58 and conducted by conduit 69 to the lower portion of the scrubber column 64, under the scrubbing trays 70 which are installed in the mid-portion of the column 64. The low-pressure air thus passes up through the trays 70 and is thoroughly scrubbed by the liquid introduced through conduit 63. The scrubbed air which is now free of impurities, flows out through conduit 66 to the lower column 27. The gaseous fraction of the high-pressure air which is separated in the scrubber-separator 60 passes from the upper portion of the separator through a conduit 71 to a heating coil 72 within the lower portion of the scrubber 64. The outlet of the heating coil 72 is connected to the lower portion of the column 27 by a conduit 73 which has interposed therein a throttle valve 74.

In this embodiment of apparatus a gaseous oxygen product is withdrawn from the separating column A' from the gas space of the chamber 30 through a conduit 75 which conducts the oxygen to a passage 76 of the main countercurrent heat exchanger in order to recover refrigeration from the oxygen product. The nitrogen product passes from the top of the separating column through the conduit 17 to the heat exchanger 58 and then by a connection 77 to the cold end of the countercurrent heat exchanger 56. The proportion of nitrogen passing through the heat exchanger 58 may be regulated by means of the valved connection 78. The relatively high boiling point impurities which are washed down and concentrated in the liquid that collects at the bottom portion of the scrubber 64 are withdrawn from the scrubber from time to time through the connection 79.

In the form of apparatus shown in Fig. 2 the operation of the separation column A' is substantially unaffected by the scrubber arrangement. The compressor 55 compresses its portion of the air to a pressure of about 2000 lbs. per sq. in. Such high-pressure air is thus readily liquefied by the heat exchanger 56. The cooling of the high-pressure air however, should not be carried to such an extent that it is entirely liquefied because it is desirable that a separation of liquid and gas phases shall occur in the separator 60. To insure the occurrence of vapor in the separator 60, the heat exchanger 58 is placed in the nitrogen conduit 17 to slightly superheat the nitrogen before it contacts the high-pressure air in exchanger 56. An expansion valve 59' is installed in the conduit 59 to allow operating the separator 60 at a pressure intermediate between the high pressure and the pressure of the lower column 27. The low-pressure air is compressed to a pressure only slightly above the pressure of the lower column 27, is countercurrently cooled in the heat exchangers 56 and 58 and is introduced into the scrubber 64 below the trays 70. The low-pressure air is thoroughly scrubbed in its passage through the trays 70 of the scrubber 64 and if the low-pressure air enters at a temperature slightly above its saturation temperature corresponding to the pressure of the lower column, some of the liquid air that enters through the conduit 63 will be vaporized and pass to the upper end of the scrubber 64. The portion of the high-pressure air that passes through the conduit 71 and through the heating coil 72 will heat the scrubber liquid that is collected in the bottom of the scrubber 64 in order to vaporize the same, and at the same time, the cooling produced by such vaporization will condense a large portion of the gas that enters the coil 72. Such heat exchange will occur because of the pressure difference between the gas in the coil 72 and the liquid in the scrubber 64. As the resulting liquid and gas is expanded through the valve 74 it is reduced to the pressure of the lower column 27. Means for observing the liquid level in the scrubbers 60 and 64 are preferably provided. Such means, however, are not shown in the interest of clearness of the drawings.

The scrubber arrangement is readily balanced according to the level of the liquid in the scrubber column 64. If the liquid tends to rise too high, the valve 74 is closed slightly in order to increase the pressure in the coil 72 and thereby increasing the quantity of heat added to the lower portion of the scrubber 64 so that more liquid is boiled off. If it is desired to increase the liquid level in the scrubber 64, less heat is applied at the lower end thereof by opening the valve 74 and lowering the pressure and temperature difference between the gas in coil 72 and the liquid surrounding it.

In the form of apparatus of Fig. 2, the irreversible heat exchange is conducted at the expense of the pressure drop from the intermediate pressure of the scrubber 60 to the pressure of the column 64 and does not impair the efficiency and output of the rectifying apparatus A'. The refrigeration lost in liquid withdrawal at 78 is supplied by increased head pressure of the high-pressure air or by supplying additional refrigeration to the compressed air.

Referring now to the form of apparatus for producing gaseous oxygen illustrated in Fig. 3, the principles of the invention are applied to an oxygen separating system in which the compressed air, which may be supplied at one or two pressures, is cooled by counter-current heat exchange with the products and by expansion to lower column pressure, to the saturation temperature corresponding to the pressure of the lower column 27, but in which there is substantially no liquid air contained in the incoming air. There is substantially no liquid in the incoming air because sufficient refrigeration is removed from the waste nitrogen leaving through conduit 17 by the heat exchanger 38 and such refrigeration is thereby transferred to the upper column reflux and thus retained in the separation column A" and is not available in the main countercurrent heat exchanger to produce liquid. It is, therefore, necessary to insure the provision of a sufficient amount of liquid for washing the incoming air. All the incoming air which has been prepared as aforesaid, enters through conduit 80 into the lower portion of a scrubber column 81.

At the upper end of the scrubber column 81, there is provided a condenser 82 arranged so that the interior of its tubes are in communication with the scrubber column 81. An evaporation chamber 83 surrounds the condenser 82. The upper portion of the scrubber 81 is also provided with a liquid collecting shelf 84 which may be employed when desired to collect a portion of the liquid condensed by the condenser 82 for transfer through a conduit 85 controlled by a valve 86, to an intermediate point of the upper column 31 of the air separation apparatus A''. The scrubber liquid collected in the lower part of the scrubber 81 is transferred to the evaporating chamber 83 by a transfer line 87 which is controlled by a valve 88. The vapors produced by the condenser-vaporizer 82 collect in the chamber 83 and are passed into the rectifying column, preferably into an intermediate portion of the upper column 31 by a conduit 89 which is controlled by a valve 89'. The impurities will collect in liquid in the lower part of the chamber 83 from which they may be withdrawn as desired through a withdrawal connection 90. The remaining gaseous portion of the incoming air which has been scrubbed free of impurities passes from the top of the condenser 82 through a conduit 91 into the lower part of the lower column 27.

At certain times, as when first starting up the apparatus, it may be desirable to transfer liquid into the vaporizer chamber 83 and for this purpose auxiliary transfer lines are employed, one line 92 connecting the lower end of the column 27 with the chamber 83. Alternatively, liquid rich in nitrogen can be withdrawn from the shelf 33 through a conduit 93 which connects the shelf with the chamber 83. The conduits 92 and 93 are controlled by valves 94 and 95, respectively.

In the normal operation of the apparatus illustrated in Fig. 3, the liquid in the vaporizer 83 will boil at a pressure substantially equal to that of the upper column 31. The refrigeration caused by such vaporization will effect condensation of air within the condenser 82 to form liquid and such liquid will drop onto the scrubber trays in the scrubber 81, thereby scrubbing the air which enters through the conduit 80. Such scrubber liquid flowing down the column 81 will wash down the impurities to the lower end of the column. The scrubber liquid containing the impurities will pass through the conduit 87 to the vaporizer 83 through a transfer valve 88 which reduces the pressure of the liquid to the pressure of the upper column. The gas produced in the vaporizer 83 will have a temperature substantially equal to the saturation temperature corresponding to the pressure of the upper column and may be directly passed into the upper column through the conduit 89 in order that the oxygen content thereof may be washed therefrom.

If it is found that too much liquid is being produced by the condenser 82, a part of such liquid can be withdrawn from the shelf 84 and passed directly to the upper column 31 by opening the valve 86. Such liquid will have been recondensed from gas which has been already scrubbed and therefore is substantially entirely free of impurities. The operation of the scrubber-condenser unit is inherently self-balancing because as the liquid level rises in the vaporizer 83, a greater portion of the condenser tubes are covered with liquid and the condensing capacity of the condenser is increased so that more liquid is produced and more heat is made available for vaporizing the greater quantity of liquid. If additional control should be desired it may be preferably obtained by providing a valve 89' in the conduit 89 which may be regulated to change the pressure in the chamber 83 and thus control the temperature difference and rate of heat flow across the condenser 82.

It will be observed that in each form of apparatus illustrated the incoming compressed and cooled air is treated before it reaches the rectifying column, that the incoming air is divided into a liquid and gaseous fraction in a manner that insures the retention of the impurities in the liquid phase, that the liquid in which the impurities are concentrated has a relatively low oxygen content, that the liquid phase in which the impurities are concentrated constitutes a small portion of the entire input air, that the larger gas phase portion of the air is passed directly into the first stage rectification or lower column, that the liquid phase fraction containing the impurities is vaporized in a manner that separates and concentrates the impurities at a place where they can be readily removed and that the vapors produced by vaporizing such liquid fraction are passed to the rectifying stages for rectification. In the preferred embodiment of this invention as applied to an apparatus producing liquid oxygen, the vaporization of the liquid fraction is effected by heat exchange with a gaseous oxygen separation product to form the desired liquid oxygen product and although there results a slight reduction of rectification efficiency, an impurity-free liquid oxygen product is assured.

It will be evident that certain features of this invention may be used independently of others and that changes in steps of the method and features of the apparatus may be made without departing from the essentials of the invention. For example, the impurity-removal system may also be applied to systems for the separation of other gas mixtures than air and which also contain higher boiling impurities. It is also contemplated that the principles of the invention may be employed for removing substantially all the carbon dioxide of the air.

I claim:

1. In a process for the separation of air by rectification in two stages at low temperatures, the steps of cooling and partly liquefying the entering air; separating the liquid phase fraction of the entering air from the gaseous phase fraction; passing the gaseous fraction into the first stage of rectification; separately vaporizing the liquid fraction to concentrate the hydrocarbon impurities therein; removing the impurity containing concentrate; and passing the vapors of such vaporization to the rectifying stages.

2. In the separation of air containing small quantities of condensable impurities by rectification in two stages at low temperatures, the steps which comprise cooling and partially liquefying the entering air; separating the liquid phase portion of such cooled air from the vapor phase portion; passing the vapor phase portion directly into the higher pressure first stage of rectification; separately vaporizing the liquid phase portion to concentrate said impurities therein; removing the impurity containing concentrates; and passing the vapors of such vaporization into the second stage of rectification.

3. Process according to claim 2 in which the vaporization of said liquid phase portion is effected by heat exchange with gaseous oxygen produced by the rectification to substantially liquefy such oxygen product.

4. In a process for the separation of air containing impurities by rectification in two stages at low temperatures the steps of cooling and partially liquefying the entering air, scrubbing such cooled and partially liquefied air with its liquid fraction to retain the impurities in such liquid fraction; separating the liquid fraction from the gas phase fraction; scrubbing another portion of incoming air at a lower pressure with such liquid fraction; condensing the gaseous fraction of said first scrubbing by effecting heat exchange with said scrubbing liquid to substantially completely vaporize said scrubbing liquid; removing the impurity containing concentrate and passing all the gas resulting from said second scrubbing and the liquid produced by said condensation to said rectifying stages.

5. In a process for the separation of air containing impurities by rectification in two stages at low temperatures, the steps of cooling and partially liquefying the entering air; scrubbing the cooled air with a liquid fraction produced by condensing a portion of such cooled air; passing the scrubbed gaseous air directly to the first stage rectification; vaporizing substantially completely the scrubbing liquid by heat exchange with gaseous portions of the entering air to effect such condensation; removing an impurity containing remainder of such vaporization and passing the vaporized scrubbing liquid to said rectifying stages.

6. A process for separating air by rectification in two stages according to claim 5 in which said vapors produced by vaporization of said scrubber liquid are passed into the second stage of rectification.

7. A process for separating air by low temperature rectification according to claim 5 in which a portion of the air which is recondensed to form scrubbing liquid is withdrawn before it is used for scrubbing incoming air, expanded and passed into the second stage rectification.

8. A process of eliminating higher boiling impurities in the separation of a gas mixture by rectification at low temperatures which comprises cooling such gas mixture containing impurities to partly liquefy said gas mixture; separating the liquid phase portion of such cooled mixture from the gas phase portion in a manner such that said impurities are retained in the liquid portion; vaporizing a major part of said liquid portion to concentrate said impurities in the remainder; withdrawing said remainder; and subjecting said gas phase portion and the impurity-free vapors produced by the vaporization of said liquid phase portion to rectification to separate the components of said gas mixture in the substantial absence of said impurities.

9. A process according to claim 8 in which the vaporization of said liquid portion is effected by heat exchange with a gaseous product of the separation to liquefy such product.

10. A process of eliminating higher boiling impurities in the separation of a gas mixture by rectification at low temperatures which comprises cooling such gas mixture containing impurities to substantially a condensation temperature; liquefying a portion of said gas mixture; scrubbing the cold gaseous portions of said mixture with said liquefied portion to retain said impurities in said liquid portion; vaporizing a major portion of said liquid containing the impurities to concentrate said impurities in a relatively small remainder of liquid; withdrawing said remainder; and subjecting the scrubbed gaseous portions of said mixture and the vapors of the vaporization of said liquid to rectification to separate the components of said gas mixture.

11. Process according to claim 10 in which the portion of the mixture liquefied is condensed by a heat exchange effecting the vaporization of said liquid containing the impurities.

12. Apparatus for eliminating higher boiling impurities prior to the separation of a gas mixture by rectification at low temperatures which comprises means for separating the liquid phase fraction of a cooled and partly liquefied gas mixture from the gaseous fraction thereof in a manner such that said impurities are substantially entirely contained in said liquid fraction; means for vaporizing a major part of said liquid fraction to concentrate the impurities in the remainder; means for withdrawing such remainder; and means for subjecting said gaseous fraction and the vapors of said vaporization of the liquid fraction to rectification.

13. Apparatus for eliminating higher boiling impurities prior to the separation of a gas mixture by rectification according to claim 12 in which said means for vaporizing said liquid fraction comprises a condenser arranged for condensing a gaseous product of the separation.

14. Apparatus for eliminating higher boiling impurities prior to the separation of a gas mixture by rectification according to claim 12 in which said means for vaporizing said liquid fraction comprises a condenser arranged for condensing a portion of said cooled gas mixture.

15. Apparatus for eliminating higher boiling impurities prior to the low temperature rectification of air which comprises means for cooling the air to be separated to condensation temperature and liquefying a portion of such air; means for scrubbing the uncondensed portion of the cooled air with the liquefied portion of the air and separating the uncondensed portion from the liquid portion whereby said liquid carries said impurities; a rectifying apparatus; means for passing said uncondensed portion of air into said rectifying apparatus; means for vaporizing a major part of said liquid portion to separate said impurities; means for withdrawing said impurities and means for passing the vapors from said vaporizing means into said rectifying apparatus.

16. Apparatus for eliminating higher boiling impurities prior to the low temperature rectification of air according to claim 15 in which said vaporizing means comprises a condenser arranged to receive and liquefy an oxygen product of said rectification.

17. Apparatus for eliminating higher boiling impurities prior to the low temperature rectification of air according to claim 15 in which said vaporizing means comprises a device arranged for effecting heat exchange between said liquid portion and portions of said uncondensed air before passage into said rectifying apparatus.

18. Apparatus for eliminating higher boiling impurities prior to the low temperature rectification of air which comprises means for cooling the air to be separated to condensation temperature and liquefying a portion of such air; means for scrubbing the uncondensed portion of the cooled air with the liquefied portion of the air and separating the uncondensed portion from the liquid portion whereby said liquid carries said impurities; a two-stage rectifying apparatus having a lower and an upper column; means for passing said uncondensed portion of the air from said scrubbing and separating means into the lower column of said apparatus; a condenser having an evaporator chamber; means for passing liquid from said scrubbing and separating means into said evaporator chamber; means for passing vapors from said evaporator chamber into said upper column; means for passing an oxygen product from said rectifying apparatus to said condenser; means for withdrawing a liquefied oxygen product from said condenser; and means for withdrawing a concentrate of said impurities from said evaporator chamber.

19. Apparatus for eliminating higher boiling impurities prior to the low temperature rectification of air according to claim 18 in which said means for passing liquid from said scrubbing and separating means to said evaporator chamber is provided with a valve for controlling the flow and reducing the pressure of said liquid substantially to that of said upper column.

20. Apparatus for eliminating higher boiling impurities prior to the low temperature rectification of air according to claim 18, which includes means for returning liquid from said condenser to said rectifying apparatus at a controlled rate; and means for transferring desired amounts of liquid from said lower column to said evaporator chamber.

21. Apparatus for eliminating higher boiling impurities prior to the low temperature rectification of air which comprises means for cooling the air to be separated to condensation temperature and liquefying a portion of such air; means for scrubbing the uncondensed portion of the cooled air with the liquefied portion of the air and separating the uncondensed portion from the liquid portion whereby said liquid carries said impurities; a rectifying apparatus; a scrubber column having upper and lower portions and scrubbing means therebetween; means for passing said liquid portion from said scrubbing and separating means to said scrubber column above said scrubbing means; means for passing another portion of cold air at a lower pressure into said scrubber column below said scrubbing means whereby said low pressure portion of air is scrubbed by said liquid portion and said liquid portion carrying the impurities of all the air collects in the lower portion of said scrubber column; means for passing said uncondensed portion of air from said scrubbing and separating means into heat exchanging relation with the liquid in the lower portion of said scrubber column and thereafter into said rectifying apparatus, said heat exchange evaporating a major part of the liquid; means for withdrawing a concentrate of said impurities from the lower portion of said scrubber column and means for passing gaseous air substantially free from impurities from the upper portion of said scrubber column into said rectifying apparatus.

22. Apparatus for eliminating higher boiling impurities prior to the low temperature rectification of air which comprises means for cooling the air to be separated to condensation temperature; a two-stage rectifying apparatus having upper and lower columns; and an impurity-separating device comprising a lower chamber having gas and liquid contact means therein, a liquid collecting space below said contact means and a condenser above said contact means; an evaporator chamber surrounding said condenser; means for admitting cold compressed air into said lower chamber below said contact means; means for transferring liquid from the lower portion of said lower chamber to said evaporator chamber; means for conducting uncondensed gas from said condenser to said lower column; means for passing vapors produced by evaporation of a major portion of the impurity-bearing liquid transferred into said evaporator chamber into said upper column; and means for withdrawing a concentrate of said impurities from said evaporator chamber.

23. Apparatus for eliminating higher boiling impurities prior to the low temperature rectification of air according to claim 22 including means for controllably transferring portions of liquid from said lower column to said evaporator chamber.

24. Apparatus for eliminating higher boiling impurities prior to the low temperature rectification of air according to claim 22 including means in said lower chamber of the separating device for collecting a portion of the liquid condensed by said condenser and means for transferring said collected portion of liquid to said upper column.

EDWARD F. YENDALL.